Patented Oct. 28, 1930

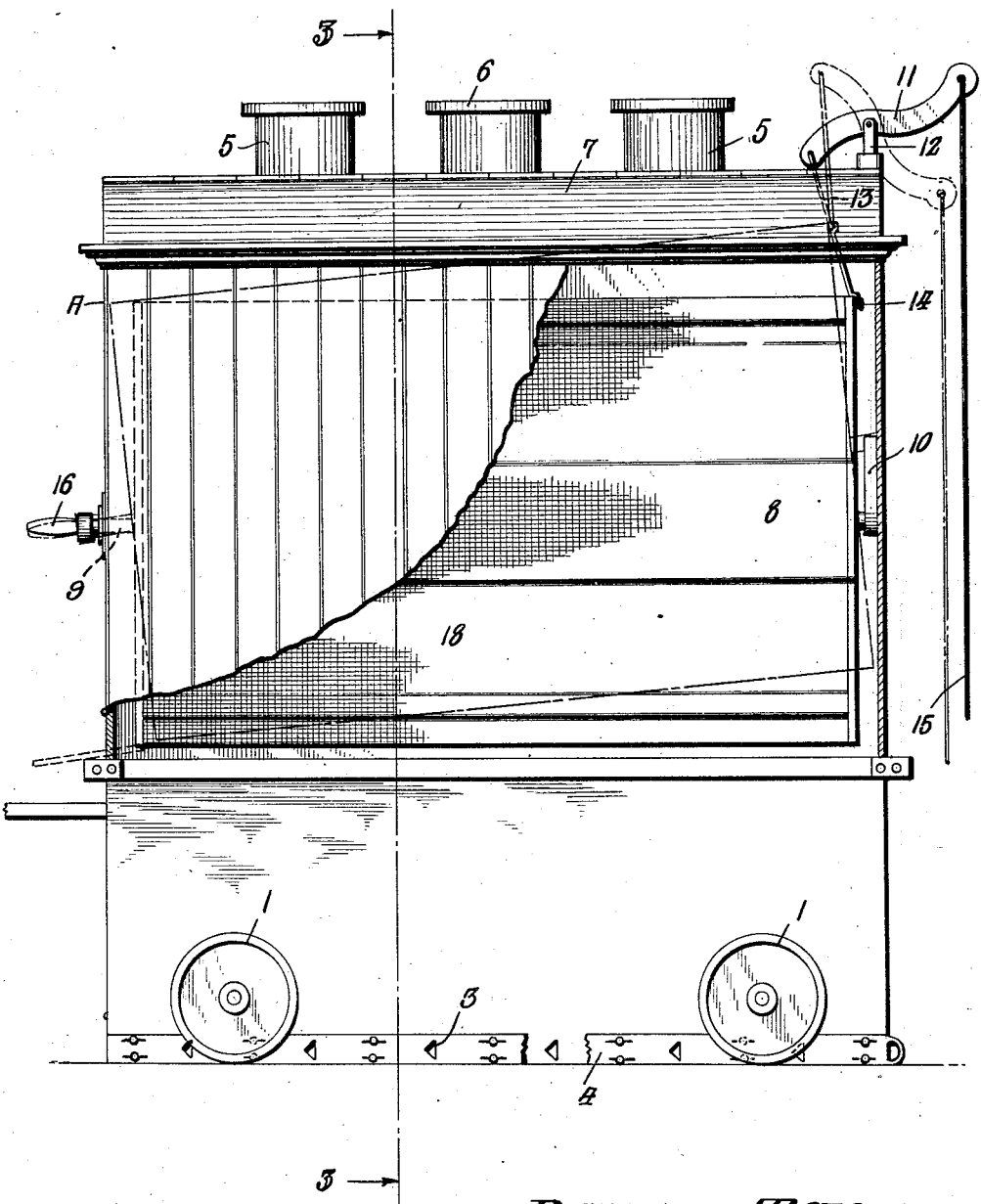

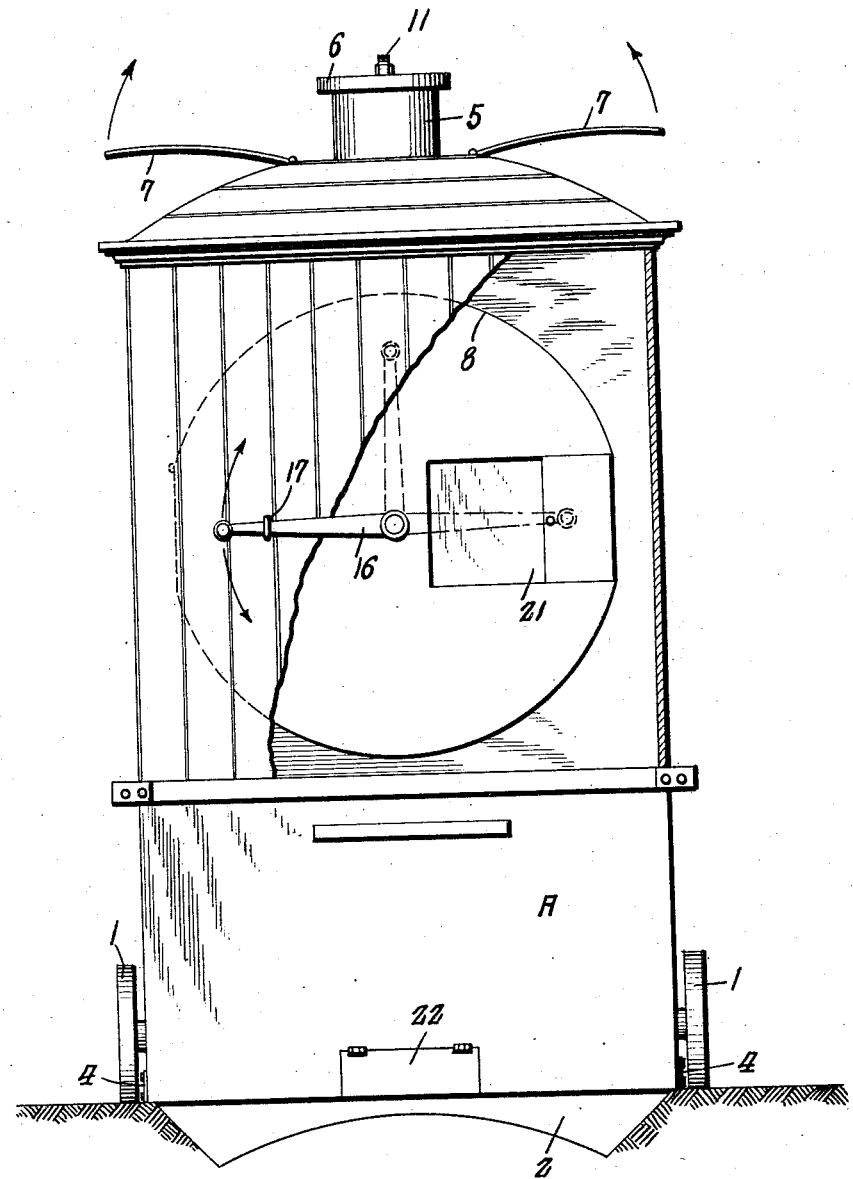

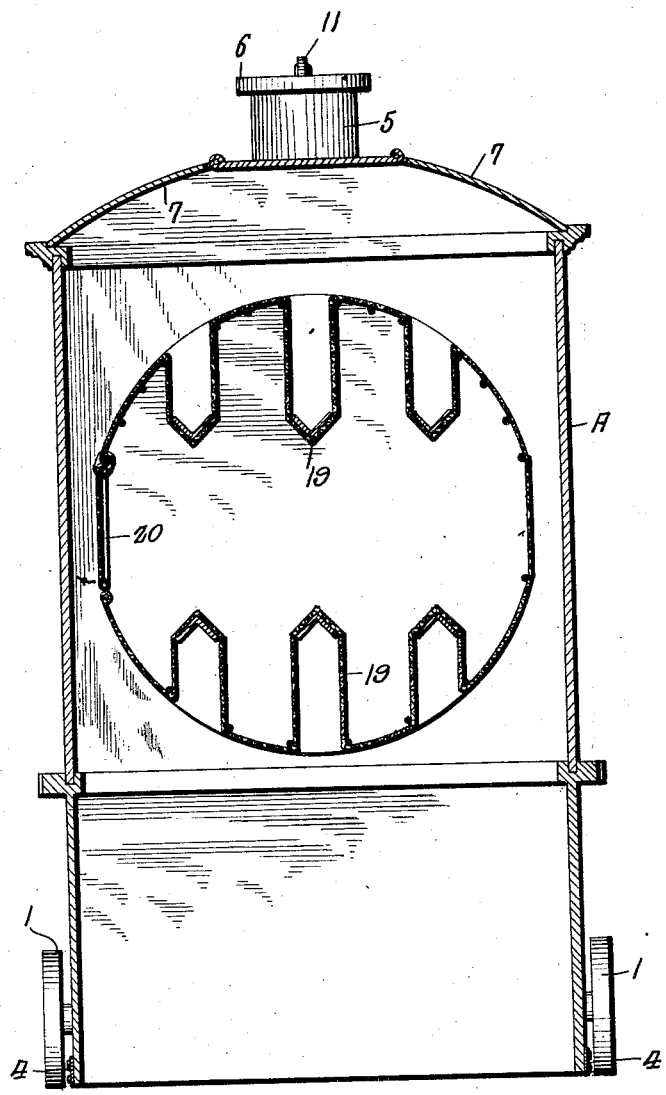

1,780,047

UNITED STATES PATENT OFFICE

RAMON TAN, OF CEBU, CEBU, PHILIPPINE ISLANDS, ASSIGNOR TO FILOMENA ARIAS, OF CEBU, PHILIPPINE ISLANDS

COPRA DRIER

Application filed July 23, 1929. Serial No. 380,380.

This invention relates to a drier for copra and the like, the general object of the invention being to provide simple means whereby the copra can be dried as well as fumigated through means of a casing properly heated and containing a rotary drum in which the copra is placed, with manually operated means for turning the drum occasionally whereby the heat will come in contact with all portions of the copra.

Another object of the invention is to provide means whereby the heat will reach the material adjacent the center of the drum and also to provide means for regulating the temperature of the air within the casing.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation with parts broken away.

Figure 2 is an end view with parts broken away.

Figure 3 is a section on line 3—3 of Figure 1.

In these views, the letter A indicates a casing preferably of rectangular shape and provided with the wheels 1 so that it can be easily transported from place to place. The casing is preferably placed over a heating chamber 2 which has a fire box or furnace at one end thereof and a chimney connected with its other end. Air is supplied to the lower part of the casing through the openings 3 which are controlled by a damper slide 4. A row of these openings is arranged at each side of the casing and each row is controlled by a damper plate at each side of the casing.

Outlets 5 are arranged in the top of the casing, which are controlled by suitable valves 6 so that the escape of the air from the casing can be regulated.

An upwardly opening door 7 is arranged in each side of the top of the casing for permitting material to be placed in the drum 8 which has its trunnions 9 suitably journaled in the casing. One trunnion is slidably supported in its bearing as shown at 10, so that this end of the drum can be raised through means of a lever 11 pivoted to the post 12 on the top of the casing at one end thereof and detachably connected to the drum by a link 13 engaging a hook 14 at one end of the drum. A cable 15 is connected with the outer end of the lever for facilitating the manipulation thereof. A crank handle 16 is connected with the other trunnion so as to impart movement to the drum, and latch means 17 are arranged for holding the crank handle in adjusted position. The drum is composed of a frame covered with wire mesh, as shown at 18, and inwardly extending projections 19 are arranged at opposite sides of the drum, these projections being in the shape of pockets and are designed to permit the heated air to enter the pockets and thus reach the interior portions of the drum and act on the material adjacent the central part of the drum. The drum is provided with an inlet door 20 in one side thereof and with an outlet door 21 in one end thereof.

From the foregoing it will be seen that by moving the drum through means of the crank handle 16 to a position where the door 20 will be under either one of the doors 7 and by opening the doors 20 and 7, the copra can be placed in the drum. The doors are then closed and the drum moved to a position where one set of pockets will be at the bottom and the other set at the top. The heated air passing through the casing will come in contact with the copra and thoroughly heat the same so that the copra is quickly dried, the moist air escaping through the outlets 5. The drum is given a half turn occasionally to facilitate the drying action and this is done by turning the handle 16 from one horizonal position to another horizontal position, as shown in full and dotted lines in Figure 2. As before stated, the pockets 19 permit the heated air to contact the copra adjacent the center of the drum. When the copra is dried, the crank handle is turned to a vertical position, as shown in dotted lines in Figure 2, which will place the outlet door 21 at the bottom of the drum and then the lever 11 is raised to its dotted line position in Figure 1, after the link is placed in engagement with the hook 14 so that the drum will be tilted to the dotted line position shown in Figure 1 and the copra will gravitate through the outlet door into a suitable receptacle. When the copra is to be fumigated by the use of sulphur or the like, the fumigating material is placed in the lower part of the casing through the door 22 in one end of the casing so that the fumes will pass through the material in the drum.

Thus I have provided an inexpensive drier for copra and the like which is portable and which will quickly dry or fumigate the copra.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A copra drier comprising upper and lower communicating sections and said lower section adapted to be positioned over a heating source and having a plurality of air inlet openings in the sides thereof and adjacent the lower edges, control slides carried by the sides of said lower section to regulate the flow of air through the openings, a cover for said upper section and having elongated door-ways, hinged doors on the cover for closing said door-ways, combined heat and air discharge means carried by the cover between said doors, a perforated drum rotatably and slidably mounted in said upper section and having door-ways either of which may be aligned with the first mentioned door-ways to receive material when the doors are open, closure means for the second mentioned door-ways, means for rotating the drum, an elevating device carried by said cover and adapted to be connected to one end of the drum to incline the latter to discharge the contents thereof from one end, and means at one side of the upper section to permit the contents of the drum to pass outwardly of the upper section when the drum is inclined.

In testimony whereof I affix my signature.

RAMON TAN.